US012767792B2

(12) United States Patent
Yamada et al.

(10) Patent No.: US 12,767,792 B2
(45) Date of Patent: Oct. 20, 2026

(54) ONE-COMPONENT THERMOSETTING EPOXY COMPOSITION WITH IMPROVED ADHESION

(71) Applicant: SIKA TECHNOLOGY AG, Baar (CH)

(72) Inventors: Shunsuke Yamada, Chigasaki (JP); Satoshi Urayama, Tokyo (JP)

(73) Assignee: SIKA TECHNOLOGY AG, Baar (CH)

( * ) Notice: Subject to any disclaimer, the term of this patent is extended or adjusted under 35 U.S.C. 154(b) by 883 days.

(21) Appl. No.: 17/801,476

(22) PCT Filed: Mar. 15, 2021

(86) PCT No.: PCT/EP2021/056487

§ 371 (c)(1),
(2) Date: Aug. 22, 2022

(87) PCT Pub. No.: WO2021/190970

PCT Pub. Date: Sep. 30, 2021

(65) Prior Publication Data

US 2023/0097570 A1 Mar. 30, 2023

(30) Foreign Application Priority Data

Mar. 25, 2020 (EP) .................................... 20165723

(51) Int. Cl.

*C08K 13/04* (2006.01)
*C08J 9/00* (2006.01)
*C08J 9/32* (2006.01)

(52) U.S. Cl.

CPC ............. *C08K 13/04* (2013.01); *C08J 9/0028* (2013.01); *C08J 9/0061* (2013.01); *C08J 9/0066* (2013.01); *C08J 9/0085* (2013.01); *C08J 9/32* (2013.01); *C08J 2203/22* (2013.01); *C08J 2363/00* (2013.01); *C08J 2409/06* (2013.01)

(58) Field of Classification Search

CPC ................ C08K 13/04; C08J 9/00; C08J 9/32
USPC .............................................................. 524/2
See application file for complete search history.

(56) References Cited

U.S. PATENT DOCUMENTS

| | | | | |
|---|---|---|---|---|
| 5,326,548 A * | 7/1994 | Otaka | C08K 7/08 106/461 |
| 2010/0028651 A1 | 2/2010 | Golden et al. | |
| 2014/0323632 A1* | 10/2014 | Lake, Jr. | C08K 3/30 524/414 |

FOREIGN PATENT DOCUMENTS

| | | | | |
|---|---|---|---|---|
| EP | 3 339 356 A1 | 6/2018 | |
| JP | 15-311150 A | 11/1993 | |
| JP | 2009-51889 A | 3/2009 | |
| JP | 2011-32329 A | 2/2011 | |
| WO | 2013/040202 A1 | 3/2013 | |
| WO | WO-2014072515 A1 * | 4/2014 | C09J 163/00 |
| WO | WO-2017220583 A1 * | 12/2017 | C08J 9/105 |
| WO | 2018/217968 A1 | 11/2018 | |

OTHER PUBLICATIONS

Apr. 12, 2021 Search Report issued in International Patent Application No. PCT/EP2021/056487.

Apr. 12, 2021 Written Opinion issued in International Patent Application No. PCT/EP2021/056487.

* cited by examiner

*Primary Examiner* — Deve V Hall
(74) *Attorney, Agent, or Firm* — Oliff PLC

(57) ABSTRACT

A one-component thermosetting epoxy resin composition includes at least one epoxy resin A having on average more than one epoxide group per molecule, at least one latent hardener B for epoxy resins, at least one impact modifier D, at least one physical or chemical blowing agent E and fibrous anhydrous magnesium oxysulfate MOS. Thermally expandable epoxy resin compositions have improved adhesion, especially on metal substrates.

15 Claims, No Drawings

ONE-COMPONENT THERMOSETTING EPOXY COMPOSITION WITH IMPROVED ADHESION

TECHNICAL FIELD

The present invention pertains to the field of thermally expandable one-component thermosetting epoxy resin composition, in particular for the production of structural foams and reinforcement of hollow structures, articles for reinforcing hollow structures, their use for reinforcing a hollow structure and a method for reinforcing a hollow structure.

PRIOR ART

An important area of application of thermally expandable, thermosetting epoxy resin additives are found in vehicle construction, especially when foaming cavities in the body-in-white.

Manufactured products often contain hollow parts that result from the manufacturing process and/or that are designed into the product for various purposes, such as weight reduction. Automotive vehicles, for example, include several such hollow parts throughout the vehicle, including in the vehicle's roof, engine hood, trunk hood and in vehicle doors.

It is often desirable to connect/bond the parts/substrates forming the hollow parts additionally at least at certain places so as to reinforce such openings and cavities so that the structure becomes more resistant to mechanical stress, but with the advantage maintains the low weight of the hollow structure.

For example, during the manufacture process of a vehicle, the hollow parts of a vehicle's roof can contain applied layers or stripes of an uncured thermosetting epoxy resin composition between roof beam and the roof layer and can still be largely covered by an electro-coating liquid while the applied thermosetting epoxy resin composition between upper and the lower roof layer are already inserted, and afterwards during a heat treatment step, the expandable thermosetting epoxy resin composition expands and firmly connects the two layers in order to reinforce the structure of the vehicle.

It is thus desirable to obtain a thermally expandable thermosetting epoxy resin composition that exhibits good material properties after curing, especially good adhesion on substrates, especially metal substrates.

SUMMARY OF THE INVENTION

It is an object of the present invention, therefore, to provide thermally expandable epoxy resin compositions with improved adhesion, especially on metal substrates.

Surprisingly it has been found that this object can be achieved by the one-component thermosetting epoxy composition as defined in claim 1.

Further aspects of the invention are subjects of further independent claims. Particularly preferred embodiments of the invention are subjects of the dependent claims.

CERTAIN EMBODIMENTS OF THE INVENTION

The present invention therefore relates to a one-component thermosetting epoxy resin composition, comprising

- 20-55 weight-%, more particularly 25-50 weight-%, preferably 25-45 weight-%, 25-40 weight-%, most preferably 25-35 weight-%, of at least one epoxy resin A having on average more than one epoxide group per molecule;
- 1-6 weight %, more particularly 2-5 weight-%, preferably 2-4 weight-%, of at least one latent hardener B for epoxy resins;
- 0-3 weight-%, more particularly 0.1-2.5 weight-%, 0.1-2.0 weight-%, 0.1-1.5 weight-%, preferably 0.1-1.0 weight-%, of at least one accelerator C;
- 10-50 weight-%, more particularly 15-45 weight-%, 20-45 weight-%, 30-45 weight-%, preferably 30-40 weight-%, of at least one impact modifier D; based on the total weight of the epoxy resin composition;
- 0.01-5 weight-%, more particularly 0.1-4 weight-%, 0.25-4 weight-%, preferably 0.5-3.5 weight-%, of at least one physical or chemical blowing agent E; and
- 2-35 weight-%, more particularly 5-30 weight-%, 7.5-25 weight-%, preferably 7.5-20 weight-%, most preferably 10-15 weight-%, of a fibrous anhydrous magnesium oxysulfate MOS.

The epoxy resin composition is one-component, meaning that the constituents of the epoxy resin composition, more particularly the epoxy resin and the hardener, are present in one component, without curing taking place at usual ambient temperature or room temperature. It can therefore be handled in this form, whereas with two-component systems the components cannot be mixed until immediately prior to use.

The curing of the one-component epoxy resin composition is accomplished by heating, typically at a temperature of more than 70° C., as in the range from 100 to 220° C., for example.

The prefix "poly" in expressions such as polyol or polyisocyanate denotes that the compound has two or more of the stated groups. A polyisocyanate, for example, is a compound having two or more isocyanate groups.

The expression "independently of one another" as used below means that in the same molecule, two or more identically denoted substituents may have identical or different meanings in accordance with the definition.

The dashed lines in the formulae in this document represent in each case the bond between the substituent in question and the associated remainder of the molecule.

Room temperature refers here to a temperature of 23° C., unless otherwise indicated.

The one-component thermosetting epoxy resin composition preferably has a needle penetration value (in 0.1 mm) of 20-80, more preferably 30-75, 40-70, most preferably 50-70, using a total load (weight of the needle and related parts) of 100 g for 5 second with a needle thickness of 1 mm at 23° C. Preferably the needle penetration value is measured as described in the experimental section.

A value over 80 has the disadvantage that the composition becomes very soft and therefore difficult to handle and to apply. The composition also has reduced form stability during handling/application.

A value under 20 has the disadvantage that the composition becomes very hard and therefore difficult to apply due to its low tack and plasticity. The low plasticity also leads to difficulties after application when the composition on the substrate is bent or contacted with an additional substrate.

The thermosetting one-component epoxy resin composition comprises 20-55 weight-% of at least one epoxy resin A having on average more than one epoxide group per molecule, based on the total weight of the one-component thermosetting epoxy resin composition. The epoxide group is preferably in the form of a glycidyl ether group.

The fraction of the epoxy resin A having on average more than one epoxide group per molecule is preferably from 25-50 weight-%, more preferably 25-45 weight-%, 25-40 weight-%, most preferably 25-35 weight-%, based on the total weight of the one-component thermosetting epoxy resin composition.

The epoxy resin A having on average more than one epoxide group per molecule is preferably a liquid epoxy resin or a solid epoxy resin. The term "solid epoxy resin" is very familiar to the person skilled in the epoxide art and is used in contrast to "liquid epoxy resins". The glass transition temperature of solid resins is above room temperature, meaning that at room temperature they can be comminuted into pourable powders.

Preferred Epoxy Resins have the Formula (II)

(II)

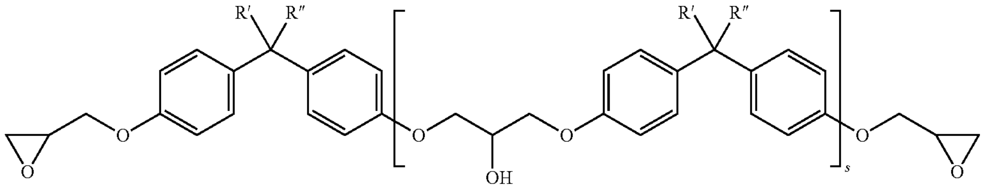

In this formula, the substituents R' and R" independently of one another are either H or $CH_3$.

In solid epoxy resins, the index s has a value of >1.5, more particularly from 2 to 12.

Solid epoxy resins of this kind are available commercially, for example, from Dow or Huntsman or Hexion.

Compounds of the formula (II) having an index s of 1 to 1.5 are referred to by the person skilled in the art as semi-solid epoxy resins. For the purposes of the present invention, they are considered likewise to be solid resins. Preferred solid epoxy resins, however, are epoxy resins in the narrower sense, in other words where the index s has a value of >1.5.

In the case of liquid epoxy resins, the index s has a value of less than 1. Preferably s has a value of less than 0.2.

The resins in question are therefore preferably diglycidyl ethers of bisphenol A (DGEBA), of bisphenol F and also of bisphenol NF. Liquid resins of these kinds are available for example as Araldite® GY 250, Araldite® PY 304, Araldite® GY 282 (Huntsman) or D.E.R.™ 331 or D.E.R.™ 330 (Dow) or Epikote 828 (Hexion).

Of further suitability as epoxy resin A are what are called epoxy novolacs. These compounds have, in particular, the following formula:

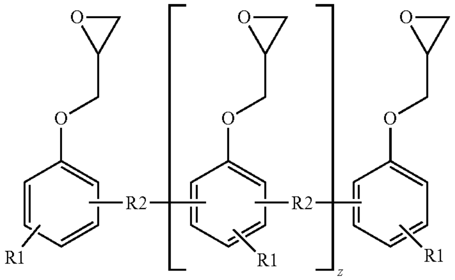

where

R2 =

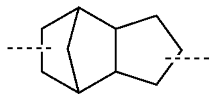

or $CH_2$, R1=H or methyl and z=0 to 7.

More particularly these are phenol-epoxy or cresol-epoxy novolacs (R2=$CH_2$).

Epoxy resins of these kinds are available commercially under the tradename EPN or ECN and also Tactix® from Huntsman, or within the product series D.E.N.™ from Dow Chemical.

The epoxy resin A is preferably a mixture of a solid epoxy resin of the formula (II) and a liquid epoxy resin of the formula (II). Preferably the weight ratio of said solid/liquid epoxy resin of the formula (II) is from 0.2-5, preferably 1-5, more preferably 2-5.

The thermosetting one-component epoxy resin composition further comprises 1-6 weight % of at least one latent hardener B for epoxy resins, based on the total weight of the one-component thermosetting epoxy resin composition. Latent hardeners are substantially inert at room temperature and are activated by elevated temperature, typically at temperatures of 70° C. or more, thereby initiating the curing reaction. The customary latent hardeners for epoxy resins can be used. Preference is given to a latent epoxy resin hardener containing nitrogen.

The latent hardener B is preferably selected from dicyandiamide, guanamines, guanidines, aminoguanidines and derivatives thereof, substituted ureas, imidazoles and amine complexes, preferably dicyandiamide.

The latent hardener B is preferably used in a stoichiometric amount based on the epoxy groups in the composition. The molar ratio of the epoxy groups to the active hydrogen of the latent hardener is preferably 0.8 to 1.2, in particular 0.9 to 1.1, preferably 0.95 to 1.05.

The fraction of the latent hardener is preferably 2-5 weight-%, preferably 2-4 weight-%, based on the total weight of the one-component thermosetting epoxy resin composition.

The thermosetting one-component epoxy resin composition further comprises 0-3 weight-%, more particularly 0.1-2.5 weight-%, 0.1-2.0 weight-%, 0.1-1.5 weight-%, preferably 0.1-1.0 weight-%, of at least one accelerator C, based on the total weight of the one-component thermosetting epoxy resin composition.

Preferred accelerators C are substituted ureas, selected more particularly from the list consisting of 3-(3-chloro-4-methylphenyl)-1,1-dimethylurea (chlortoluron), p-chlorophenyl-N,N-dimethylurea (monuron), 3-phenyl-1,1-dimethylurea (fenuron), 3,4-dichlorophenyl-N,N-dimethylurea (diuron), N, N-dimethylurea, N-isobutyl-N', N'-dimethylurea and 1,1'-(hexane-1,6-diyl)bis(3,3'-dimethylurea). A particularly preferred accelerator C is N,N-Dimethylurea.

The thermosetting one-component epoxy resin composition further comprises 10-50 weight-% of at least one impact modifier D, based on the total weight of the one-component thermosetting epoxy resin composition.

The impact modifier is added primarily to improve the strength of the thermosetting epoxy resin composition against the impact forces.

The impact modifier D can be solid or liquid.

The impact modifier D is preferably selected from the group consisting of blocked polyurethane polymers D1, carboxyl-terminated acrylonitrile/butadiene copolymers D2, epoxy-terminated acrylonitrile/butadiene copolymers D3, liquid rubbers D4 and core-shell polymers D5. More preferably, the impact modifier D is selected from the group consisting of blocked polyurethane polymers D1, carboxyl-terminated acrylonitrile/butadiene copolymers D2 and liquid rubbers D4, especially blocked polyurethane polymers D1 and carboxyl-terminated acrylonitrile/butadiene copolymers D2.

A preferred impact modifier D1 is a terminally blocked polyurethane prepolymer of the following formula (III)

(III)

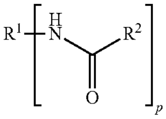

In this formula $R^1$ is a p-valent residue of a linear or branched polyurethane prepolymer PU1, terminated by isocyanate groups, following the removal of the terminal isocyanate groups, and p is from 2 to 8.

Furthermore, $R^2$ independently at each occurrence is a substituent selected from the group consisting of

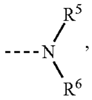, 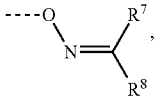, 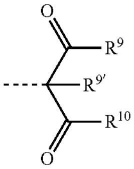,

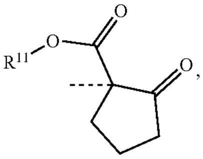, 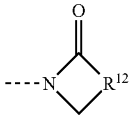, 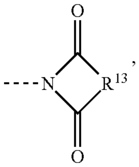,

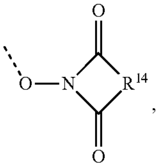, 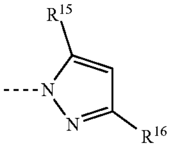, 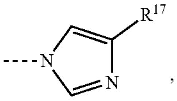,

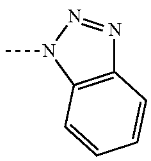, 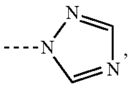, 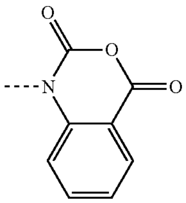,

-continued

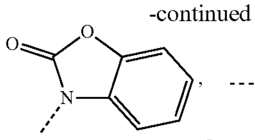, 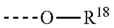 and

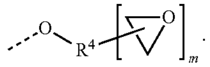.

In these formulae $R^5$, $R^6$, $R^7$ and $R^8$ each independently of one another are an alkyl or cycloalkyl or aralkyl or arylalkyl group, or $R^5$ together with $R^6$, or $R^7$ together with $R^8$, forms part of a 4- to 7-membered ring which is optionally substituted.

Furthermore, $R^9$, $R^{9'}$ and $R^{19}$ each independently of one another are an alkyl or aralkyl or arylalkyl group or are an alkyloxy or aryloxy or aralkyloxy group and $R^{11}$ is an alkyl group.

$R^{12}$, $R^{13}$ and $R^{14}$ each independently of one another are an alkylene group having 2 to 5 C atoms which optionally has double bonds or is substituted, or are a phenylene group or are a hydrogenated phenylene group.

$R^{15}$, $R^{16}$ and $R^{17}$ each independently of one another are H or are an alkyl group or are an aryl group or an aralkyl group and $R^{18}$ is an aralkyl group or is a mono- or polycyclic, substituted or unsubstituted aromatic group which optionally has aromatic hydroxyl groups.

Finally $R^4$ is a residue of an aliphatic, cycloaliphatic, aromatic or araliphatic epoxide containing a primary or secondary hydroxyl group, following the removal of the hydroxide and epoxide groups, and m is 1, 2 or 3.

Residues for consideration as $R^{18}$ include in particular, on the one hand, phenols or polyphenols, especially bisphenols, following removal of a hydroxyl group. Preferred examples of such phenols and bisphenols are, in particular phenol, cresol, resorcinol, pyrocatechol, cardanol (3-pentadecenylphenol (from cashewnut shell oil)), nonylphenol, phenols reacted with styrene or with dicyclopentadiene, bisphenol A, bisphenol F and 2,2'-diallylbisphenol A.

Residues for contemplation as $R^{18}$ are on the other hand, in particular, hydroxybenzyl alcohol and benzyl alcohol following removal of a hydroxyl group.

If $R^5$, $R^6$, $R^7$, $R^8$, $R^9$, $R^{9'}$, $R^{10}$, $R^{11}$, $R^{15}$, $R^{16}$ or $R^{17}$ is an alkyl group, this group is more particularly a linear or branched $C_1$-$C_{20}$ alkyl group.

If $R^5$, $R^6$, $R^7$, $R^8$, $R^9$, $R^{9'}$, $R^{10}$, $R^{15}$, $R^{16}$, $R^{17}$ or $R^{18}$ is an aralkyl group, this moiety is more particularly an aromatic group, which is bonded via methylene, and more particularly is a benzyl group.

If $R^5$, $R^6$, $R^7$, $R^8$, $R^9$, $R^{9'}$ or $R^{10}$ is an alkylaryl group, this group more particularly is a $C_1$ to $C_{20}$ alkyl group which is bonded via phenylene, such as a tolyl or xylyl group, for example.

The residues $R^2$ are preferably the substituents of the formulae

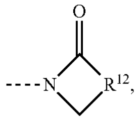, 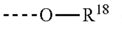 or 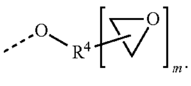.

A preferred substituent of the formula

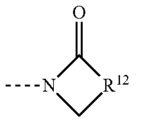

is ε-caprolactam following removal of the NH proton.

A preferred substituent of the formula —O—$R^{18}$ are monophenols or polyphenols, more particularly monophenols or bisphenols, following removal of a phenolic hydrogen atom. Particularly preferred examples of such residues $R^2$ are residues selected from the group consisting of

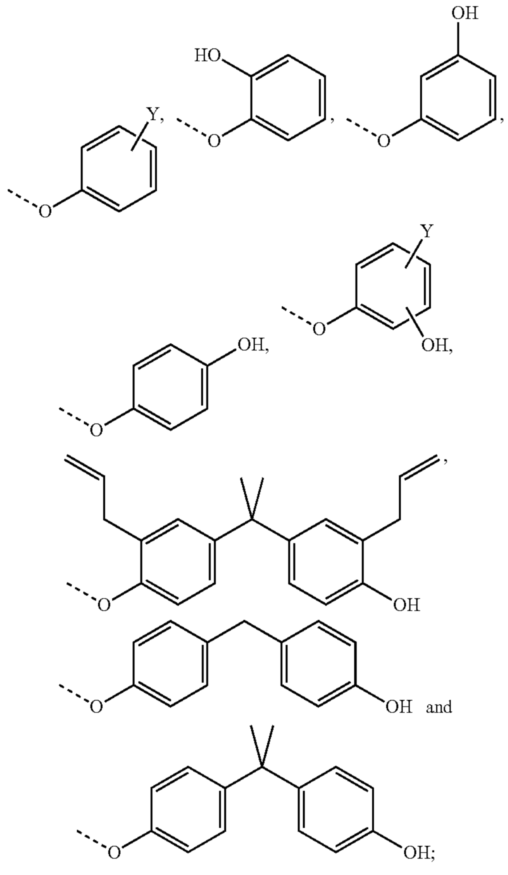

The residue Y here is a saturated or olefinic unsaturated hydrocarbon residue having 1 to 20 C atoms, more particularly having 1 to 15 C atoms. Preferred as Y in particular are allyl, methyl, nonyl, dodecyl or an unsaturated $C_{15}$ alkyl radical having 1 to 3 double bonds.

The terminally capped polyurethane prepolymer of the formula (I) is prepared from the isocyanate-terminated linear or branched polyurethane prepolymers PU1 with one or more isocyanate-reactive compounds $R^2H$. If a plurality of such isocyanate-reactive compounds are used, the reaction can be effected sequentially or with a mixture of these compounds.

The reaction is effected in such a way that the one isocyanate-reactive compound or the plurality of isocyanate-reactive compounds $R^2H$ is/are used stoichiometrically or in a stoichiometric excess, in order to ensure that all NCO groups are converted.

The polyurethane prepolymer PU1 on which $R^1$ is based can be prepared from at least one diisocyanate or triisocyanate and from a polymer $Q_{PM}$ with terminal amino, thiol or hydroxyl groups.

Suitable diisocyanates are aliphatic, cycloaliphatic, aromatic or araliphatic diisocyanates, especially commercial products such as methylenediphenyl diisocyanate (MDI), hexamethylene diisocyanate (HDI), tolylene diisocyanate (TDI), toluidine diisocyanate (TODD, isophorone diisocyanate (IPDI), trimethylhexamethylene diisocyanate (TMDI), 2,5- or 2,6-bis(isocyanatomethyl)bicyclo[2.2.1]heptane, 1,5-naphthalene diisocyanate (NDI), dicyclohexylmethyl diisocyanate ($H_{12}MDI$), p-phenylene diisocyanate (PPDI), m-tetramethylxylylene diisocyanate (TMXDI), etc., and the dimers thereof. Preference is given to HDI, IPDI, MDI or TDI.

Suitable triisocyanates are trimers or biuretes of aliphatic, cycloaliphatic, aromatic or araliphatic diisocyanates, especially the isocyanurates and biurets of the diisocyanates described in the preceding paragraph.

It will be appreciated that it is also possible to use suitable mixtures of di- or triisocyanates.

Especially suitable polymers $Q_{PM}$ with terminal amino, thiol or hydroxyl groups are polymers $Q_{PM}$ with two or three terminal amino, thiol or hydroxyl groups.

The polymers $Q_{PM}$ advantageously have an equivalent weight of 300-6000, especially of 600-4000 and especially of 700-2200 g/equivalent of NCO-reactive groups.

The polymers $Q_{PM}$ are advantageously difunctional or higher-functionality polyols with OH equivalent weights of 300 to 6000 g/OH equivalent, especially of 600 to 4000 g/OH equivalent, preferably 700-2200 g/OH equivalent. Also advantageously, the polyols are selected from the group consisting of polyethylene glycols, polypropylene glycols, polyethylene glycol-polypropylene glycol block copolymers, polybutylene glycols, hydroxyl-terminated polybutadienes, hydroxyl-terminated butadiene/acrylonitrile copolymers, hydroxyl-terminated synthetic rubbers, the hydrogenation products thereof and mixtures of these said polyols.

In addition, the polymers $Q_{PM}$ used may also be difunctional or higher-functionality amino-terminated polyethylene ethers, propylene ethers, as sold, for example, under the Jeffamine® name by Huntsman, polybutylene ethers, polybutadienes, butadiene/acrylonitrile copolymers, as sold, for example, under the Hycar® ATBN name by Nanoresins AG, Germany, and further amino-terminated synthetic rubbers or mixtures of the components mentioned.

Preferred polymers $Q_{PM}$ are polyols with average molecular weights between 600 and 6000 g/mol, selected from the group consisting of polyethylene glycols, polypropylene glycols, polyethylene glycol-polypropylene glycol block polymers, polybutylene glycols, hydroxyl-terminated polybutadienes, hydroxyl-terminated butadiene-acrylonitrile copolymers and mixtures thereof.

Especially preferred polymers $Q_{PM}$ are α, ω-dihydroxy-polyalkylene glycols with $C_2$-$C_6$-alkylene groups or with mixed $C_2$-$C_6$-alkylene groups terminated with amino, thiol or preferably hydroxyl groups. Particular preference is given to polypropylene glycols or polybutylene glycols. Also particularly preferred are hydroxyl-terminated polyoxybutylenes.

The carboxyl-terminated acrylonitrile/butadiene copolymer or derivative thereof impact modifiers D2 are commercially available under the tradename Hycar® CTBN from Nanoresins AG, Germany.

The is epoxy-terminated acrylonitrile/butadiene copolymer or derivative thereof impact modifiers D3 are commercially available under the tradename HyPox™ such as, for example, HyPox™ RA1340 or HyPox™ RA840 from Emerald Performance Materials LLC.

Preferred liquid rubbers D4 are NBR and SBR.

The amount of impact modifier D is preferably 15-45 weight-%, 20-45 weight-%, 30-45 weight-%, more preferably 30-40 weight-%, based on the total weight of the epoxy resin composition.

The thermosetting one-component epoxy resin composition further comprises 0.01-5 weight-% of at least one physical or chemical blowing agent E, based on the total weight of the one-component thermosetting epoxy resin composition.

Chemical blowing agents are organic or inorganic substances which, under the influence of temperature, humidity, electromagnetic radiation or chemicals, form or split off gaseous substances. Such substances are in particular azodicarbonamides, sulfohydrazides, hydrogen carbonates or carbonates. Compounds can be used as physical blowing agents which, for example when the temperature, pressure or volume changes, in particular when the temperature rises, change to the gaseous state of matter and thus form a foam structure through volume expansion. Such physical blowing agents are in particular liquids which evaporate at elevated temperature. Furthermore, gases or low-boiling liquids can be used as physical blowing agents, which are introduced into the composition in microencapsulated form. Both chemical and physical blowing agents are able to produce foam structures in polymer compositions.

Preferred physical blowing agents are expandable microspheres, consisting of a thermoplastic shell which is filled with thermally expandable liquids or gases. Such microspheres are commercially available, for example, under the trade name Expancel® from Akzo Nobel, the Netherlands.

The blowing agent can preferably be foamed at a temperature of 160 160° C., in particular from 80° C. to 150° C., preferably from 90° C. to 140° C.

The proportion of at least one physical or chemical blowing agent E is advantageously 0.1-4 weight-%, 0.25-4 weight-%, preferably 0.5-3.5 weight-%, based on the total weight of the one-component thermosetting epoxy resin composition.

The thermosetting one-component epoxy resin composition further comprises 2-35 weight-% of a fibrous anhydrous magnesium oxysulfate MOS, based on the total weight of the one-component thermosetting epoxy resin composition.

The proportion of fibrous anhydrous magnesium oxysulfate MOS is preferably 5-30 weight-%, 7.5-25 weight-%, more preferably 7.5-20 weight-%, most preferably 10-15 weight-%, based on the total weight of the one-component thermosetting epoxy resin composition.

It was surprisingly found that the beforementioned amounts of fibrous anhydrous magnesium oxysulfate MOS lead to an increase in mechanical properties of the cured epoxy resin composition, especially improved adhesion, particularly on metal substrates, while maintaining the volume expansion properties. Especially the lap shear values and the failure mode can be surprisingly significantly improved.

This can be seen for example in table 1 by the effect of changes in the amount of MOS on the lap shear strength values as well as on failure mode in E1-E3. The comparison of Ref.1-Ref.3 with E1 shows the difference between MOS and various similar components typically used as fillers like calcium carbonate, recycled carbon fiber and wollastnite.

Preferably, the fibrous anhydrous magnesium oxysulfate MOS ($MgSO_4 \cdot 5Mg(OH)_2$) is selected from the list consisting of $MgSO_4 \cdot 5Mg(OH)_2 \cdot 3H_2O$ and $MgSO_4 \cdot 5Mg(OH)_2 \cdot 8H_2O$, preferably $MgSO_4 \cdot 5Mg(OH)_2 \cdot 3H_2O$.

Preferably, the fibrous anhydrous magnesium oxysulfate MOS has a length of 3 to 1000 μm, preferably 5 to 100 μm, more preferably 7.5 to 50 μm, most preferably 7.5 to 20 μm.

Preferably, the fibrous anhydrous magnesium oxysulfate MOS has a diameter of 0.1 to 5 μm, preferably 0.2 to 2 μm, more preferably 0.3 to 1 μm, most preferably 0.4 to 0.8 μm.

Preferably, the fibrous anhydrous magnesium oxysulfate MOS has a BET specific surface area of less than 30 $m^2/g$, preferably 2.5 to 20 $m^2/g$, more preferably 5 to 15 $m^2/g$.

In one preferred embodiment, the one-component thermosetting epoxy resin composition further comprises at least one filler F. Preference here is given to mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminium hydroxide, hollow ceramic beads, hollow glass beads, hollow organic beads, glass beads, glass fibres and colour pigments. Particularly preferred are fillers selected from the group consisting of calcium carbonate, calcium oxide, talc, glass fibres and fumed silicas, more preferably talc, glass fibres and fumed silicas.

The total fraction of the overall filler F is advantageously 3-50 weight-%, preferably 5-40 weight-%, 8-35 weight-%, based on the total weight of the epoxy resin composition.

The one-component thermosetting epoxy resin composition may comprise further constituents, especially catalysts, stabilizers, particularly heat and/or light stabilizers, thixotropic agents, plasticizers, solvents, dyes and pigments, corrosion inhibitors, surfactants, defoamers and adhesion promoters.

The one-component thermosetting epoxy resin composition can also contain one or more additives. Examples of additives which can be used are processing aids such as waxes, antioxidants, UV stabilizers, dyes, biocides or flame retardants.

The proportion of processing aid is advantageously 1 to 8% by weight, preferably 2 to 5% by weight, based on the total weight of the composition.

The one-component thermosetting epoxy resin composition is preferably tacky at 23° C. The term "tacky" in this this document refers to a surface tack in the sense of instantaneous adhesion or stickiness that is preferably sufficient at 23° C. so that, when pressed with a thumb, exerting a pressure of 5 kg for 1 second on the surface of the thermosetting epoxy resin composition, the thumb remains sticking to the surface of the thermosetting epoxy resin composition. Preferably in this way, after the surface of the thermosetting epoxy resin composition has been pressed with a thumb at 23° C., exerting a pressure of 5 kg for 1 second, a thermosetting epoxy resin composition having an intrinsic weight of 50 g can be lifted up for at least 5 seconds.

A particularly preferred thermosetting one-component epoxy resin composition comprises:

20-55 weight-%, more particularly 25-50 weight-%, preferably 25-45 weight-%, 25-40 weight-%, most preferably 25-35 weight-%, of at least one epoxy resin A having on average more than one epoxide group per molecule, preferably the epoxy resin A is a mixture of a solid epoxy resin of the formula (II) and a liquid epoxy resin of the formula (II);

1-6 weight %, more particularly 2-5 weight-%, preferably 2-4 weight-%, of at least one latent hardener B for epoxy resins, preferably dicyandiamide;

0-3 weight-%, more particularly 0.1-2.5 weight-%, 0.1-2.0 weight-%, 0.1-1.5 weight-%, preferably 0.1-1.0 weight-%, of at least one accelerator C, preferably a substituted urea;

10-50 weight-%, more particularly 15-45 weight-%, 20-45 weight-%, 30-45 weight-%, preferably 30-40 weight-%, of at least one impact modifier D, preferably selected from the group consisting of blocked polyurethane polymers D1, carboxyl-terminated acrylonitrile/butadiene copolymers D2 and liquid rubbers D4, especially blocked polyurethane polymers D1 and carboxyl-terminated acrylonitrile/butadiene copolymers D2;

0.01-5 weight-%, more particularly 0.1-4 weight-%, 0.25-4 weight-%, preferably 0.5-3.5 weight-%, of at least one physical or chemical blowing agent E; and 2-35 weight-%, more particularly 5-30 weight-%, 7.5-25 weight-%, preferably 7.5-20 weight-%, most preferably 10-15 weight-%, of a fibrous anhydrous magnesium oxysulfate MOS;

preferably 5-40 weight %, preferably 20-40 weight %, based on the total weight of the epoxy resin composition, of a filler F selected from the group consisting of calcium carbonate, calcium oxide, talc, glass fibres and fumed silicas.

The thermosetting epoxy resin composition has a needle penetration value of (in 0.1 mm) of 20-80, more preferably 30-75, 40-70, most preferably 50-70, using a total load (weight of the needle and related parts) of 100 g for 5 second with a needle thickness of 1 mm at 23° C.

The thermosetting epoxy resin composition preferably is tacky at 23° C.

It may further be advantageous if the preferred one-component thermosetting epoxy resin composition consists to an extent of more than 80 weight %, preferably more than 90 weight %, more particularly more than 95 weight %, especially preferably more than 98 weight %, most preferably more than 99 weight %, based on the total weight of the epoxy resin composition, of the aforementioned constituents.

The compositions according to the present invention can be obtained by mixing the components in any suitable mixing device, e.g. In a dispersion mixer, planetary mixer, twin screw mixer, continuous mixer, extruder or twin-screw extruder.

After mixing, the resulting composition can be molded into their desired shape e.g. by extruding, blow molding, pelletizing, injection molding, compression molding, stamping or punching or any other suitable method.

The mixing of the components preferably comprises an extrusion step, the mixed and extruded composition then being granulated. The granulated composition is then preferably brought into its desired shape by injection molding.

The foaming of the one-component thermosetting epoxy resin composition is preferably carried out independently of the curing of the epoxy resin composition, in particular beforehand. As a result, the epoxy resin composition cures only when the foaming of the epoxy resin composition has largely taken place. Otherwise, the epoxy resin composition hardens before it has reached the intended place through the foaming.

It is therefore preferred that the curing temperature of the epoxy resin composition is above the foaming temperature of the epoxy resin composition.

Preferably, the one-component thermosetting epoxy resin composition shows the following characteristics after curing:

Volume expansion after 20 min @ 180° C.: 50-400%, preferably 80-300%, more preferably 100-200%

Lap shear strength after 10 min @ 155° C.: 1-20 MPa, preferably 2-15 MPa, more preferably 3-10 MPa.

Preferably, the one-component thermosetting epoxy resin composition can be foamed and cured thermally, at a temperature from 120° C. to 220° C., preferably from 140° C. to 200° C., preferably within a time period at said temperature of 10 to 60 min.

Another aspect of the invention is an article having a three-dimensional extent, more preferably having a sheet-like form, more particularly being in the form of a strip or a sheet or a patch, comprising, preferably consisting of, the before mentioned one-component thermosetting epoxy resin composition, in particular for reinforcement in the cavities of structural components.

Preferably, as strips, these articles are 20-500 mm, more preferred 50-250 mm, in length, 2-15 mm, more preferred 5-10 mm, in width and 0.5-5 mm, more preferred 1-3 mm, in thickness.

Preferably, as patches, these articles are 20-500 mm in length and in width and 0.5-5 mm, more preferred 1-3 mm, in thickness.

The before mentioned article is preferably used for the reinforcement of heat-stable materials, more particularly structural components. Heat-stable materials are dimensionally stable at least during the curing process at a curing temperature of 100-220° C., preferably 150-210° C. Particularly heat-stable materials are metals, plastics (such as ABS, polyamide and polyphenylene ether), polysulfones, polyether sulfones, poly(phenylene ether), and composite materials (such as sheet moulding compounds, unsaturated polyester GRP, composite epoxide materials and composite acrylate materials).

In a preferred application, the structural component being reinforced by the article of the invention is of metal. More particularly the metal has been coated by cathodic electrodeposition (CED).

A particularly preferred use of the article of the invention is in the reinforcement of metals, especially in body shell construction in the automotive industry. The preferred metals include steel and aluminium. The preferred examples of steel includes electrolytically galvanized steel, hot-dip galvanized steel, oiled steel, Bonazinc-coated steel, and subsequently phosphatized steel.

A further aspect of the invention is therefore the use of the article for reinforcing heat-stable materials, more particularly structural components.

Preferably, the structural components being reinforced have a thickness of 0.2-1.2 mm, preferably 0.4-1.0 mm and more preferably 0.5 and 0.6 mm.

The article preferably possesses self-adhesive properties due to tackiness so may preferably be applied without using any fastening means. The article may be employed particularly for reinforcement at locations which are not accessible to welding instruments/robots during assembly, owing to inaccessibility/narrow confines.

Additional fastening means may be employed to secure the article on the surface of the structural components. Preferably, the article has no additional fastening means.

The expandable article placed inside the structural component gets foamed up in the course of heating, and by virtue of the full chemical curing of the thermosetting epoxy resin composition it is capable of transmitting large forces and therefore reinforcing the structural component.

Structural components of this type are preferably used in bodies and/or frames of means of transport and transportation, in particular of vehicles on water or on land or of aircraft. The invention preferably includes the use of a reinforcing element according to the invention in bodies or frames of automobiles (in particular roof, engine hood, trunk hood and in doors), trucks, railroad cars, boats, ships, helicopters and airplanes, mostly preferably in automobiles.

The article is in particular first contacted with the materials to be reinforced, more particularly structural components, at a temperature of between 10° C. and 80° C., more particularly between 10° C. and 60° C., and are later cured to completion at a temperature of typically 140-220° C., more particularly of 150-210° C., preferably of between 160 and 205° C.

After being cured, the article provides good mechanical properties (especially high lap shear values and good failure mode) to the structural component. The article of the invention gets cured completely when it is subjected to a temperature above the activation temperature of the hardener B. Further, on being cured, the article of the invention gets adhered to the surface of the structural component effectively, especially to metallic substrates.

A further aspect of the present invention therefore relates to a method for reinforcing a structural component comprising the steps:

i) placing the before mentioned one-component thermosetting epoxy resin composition, preferably the before mentioned article, in a cavity of the structural component;
ii) heating the one-component thermosetting epoxy resin composition, preferably the article, to a temperature from 120° C. to 220° C., preferably from 140° C. to 200° C., preferably for 10 to 60 min.

In particular, the invention comprises a method for reinforcing structural components, the one-component thermosetting epoxy resin composition being thermally foamable, wherein step i) is followed by step ii).

The result of the method is a reinforced article. The reinforced article of this kind is preferably a vehicle or an ancillary vehicle component.

A further aspect of the present invention therefore relates to the reinforced article obtained from the aforesaid method.

The invention is elucidated further in the text below by means of examples which, however, are not intended to restrict the invention in any way.

EXAMPLES

Test methods used for the testing of the respective properties in the examples were as follows:

| | |
|---|---|
| Rubber1 | NBR |
| Rubber2 | SBR |
| Liquid Epoxy | Liquid epoxy resin of formula (II) |
| Solid Epoxy | Solid epoxy resin of formula (II) |
| Carbon black | Carbon black |
| Calcium oxide | Calcium oxide |
| Stabilizer | Hindered phenolic antioxidant |
| MOS | MOS-HIGE, fibrous magnesium oxysulfate [$MgSO_4$•5$Mg(OH)_2$•3$H_2O$], fiber length 10-20 μm, fiber diameter 0.5 μm, BET specific surface area 10 $m^2$/g, Ube Material Industries, Ltd., Japan. |
| Calcium Carbonate | Calcium Carbonate |
| Recycled Carbon fiber | Recycled Carbon fiber |
| Wollastnite | Wollastnite |
| BA | Physical blowing agent, Expancel, Akzo Nobel, Netherlands |
| DICY | Dicyandiamide |

-continued

| | |
|---|---|
| Accelerator | Substituted urea |
| Aluminium hydroxide | Aluminium hydroxide |
| D1 | Terminally blocked polyurethane polymer D1 of formula (1) |
| D2-1 | Liquid CTBN |
| D2-2 | Solid CTBN |
| Fumed Silica | Fumed Silica, Wacker |

Raw materials used

Preparation of the Compositions

According to the information in Table 1 and 2, the reference compositions Ref.1-Ref.4 and the compositions E1-E5 according to the invention were produced. The amounts in Table 1 and 2 are in parts by weight. The raw materials used were mixed with a sigma mixer for 30 min. All the compositions Ref.1-Ref.4 and E1-5 were tacky at 23° C. according to the definition described before.

The following measurements were carried out on the test specimens obtained:

Test Methods:

Needle Penetration

Penetration depth was measured by preparing square samples of freshly mixed compositions (30 mm×30 mm×thickness 10 mm). For the measurement, a 1 mm thin needle was placed on the surface of the sample and released to penetrate the sample for 5 sec. The total load (weight of the needle and related parts) was 100 g. The penetrated depth of the needle is given in 0.1 mm. The measurements were performed at 23° C. High penetration value means low viscosity of the composition.

Determination of Foam Density/Volume Expansion (Expansion)

The expansion stability was tested in all samples by heat treatment of the individual samples at different temperatures as indicated in table 1 and table 2 in an oven. The temperatures, periods and extent of expansion (in % based on the original volume before expansion) are shown in table 1 and table 2.

Expansions were quantified for each sample by measuring the density before and after expansion. The densities were determined according to DIN EN ISO 1183 using the water immersion method (Archimedes principle) in deionized water and a precision balance to measure the mass.

Tensile Shear Strength (LSS)

The determination follows the general lines of ASTM D1002-10. The tensile shear strength was determined using the following set-up (dimensions in mm):

Test temperature: 23° C.

Bond area: 10 mm×20 mm

Adhesive layer thickness: 0.2 mm

Curing: as shown in table 1 and table 2

Test velocity: 10 mm/min

Cohesive Fracture/Adhesive Fracture (Fracture Mode)

Visual assessment of the fracture mode obtained from the tensile shear strength, divided into CF and AF. CF=cohesive fracture, AF=adhesive fracture.

TABLE 1

| Composition | | Ref. 1 | Ref. 2 | Ref. 3 | E1 | E2 | E3 | E4 |
|---|---|---|---|---|---|---|---|---|
| Rubber1 | | 9 | 9 | 9 | 9 | 9 | 9 | 9 |
| Rubber2 | | 6 | 6 | 6 | 6 | 6 | 6 | 6 |
| Liquid Epoxy | | 23.5 | 23.5 | 23.5 | 23.5 | 23.5 | 23.5 | 23.5 |
| Solid Epoxy | | 23.5 | 23.5 | 23.5 | 23.5 | 23.5 | 23.5 | 23.5 |
| Carbon black | | 0.8 | 0.8 | 0.8 | 0.8 | 0.8 | 0.8 | 0.8 |
| Calcium oxide | | 5 | 5 | 5 | 5 | 5 | 5 | 5 |
| Stabilizer | | 0.4 | 0.4 | 0.4 | 0.4 | 0.4 | 0.4 | 0.4 |
| MOS | | | | | 27 | 15 | 5 | 14.8 |
| Calcium Carbonate | | 27 | | | | 12 | 22 | 12 |
| Recycled Carbon fiber | | | 27 | | | | | |
| Wollastnite | | | | 27 | | | | |
| BA1 | | 2.3 | 2.3 | 2.3 | 2.3 | 2.3 | 2.3 | 2.3 |
| DICY | | 2.5 | 2.5 | 2.5 | 2.5 | 2.5 | 2.5 | 2.5 |
| Accelerator | | | | | | | | 0.2 |
| Total | | 100 | 100 | 100 | 100 | 100 | 100 | 100 |
| Volume expansion (%) | 20 min @ 180° C. | 127.7 | 88.2 | 97.4 | 102.8 | 96.4 | 104.7 | 113.2 |
| Lap shear strength (MPa) | 10 min @ 155° C. | 0.9 | 0.3 | 0.4 | 2.8 | 1.8 | 0.6 | 7.8 |
| | 20 min @ 180° C. | 3.0 | 3.6 | 5.2 | 9.6 | 8.6 | 4.6 | 7.3 |
| Failure mode | 20 min @ 180° C. | 100% CF | 100% AF | 50% CF | 50% CF | 90% CF | 98% CF | 100% CF |
| Penetration | | 83 | 50 | 62 | 47 | 64 | 74 | 63 |

TABLE 2

| Composition | Ref. 4 | E5 |
|---|---|---|
| D1 | 8.2 | 8.2 |
| Liquid Epoxy | 22.4 | 22.4 |
| Aluminium hydroxide | 14.5 | 14.5 |
| D2-1 | 5.7 | 5.7 |
| D2-2 | 18.5 | 18.5 |
| fumed silica | 6.3 | 6.3 |
| Calcium oxide | 2.4 | 2.4 |
| Stabilizer | 0.1 | 0.1 |
| Calcium Carbonate | 16.4 | 6.4 |
| MOS | | 10 |
| BA | 3 | 3 |
| DICY | 3.1 | 3.1 |
| Accelerator | 0.35 | 0.35 |
| Total | 100 | 100 |
| Volume expansion (%) 10 min @ 155° C. | 160.2 | 157.6 |
| Volume expansion (%) 60 min @ 190° C. | 182.1 | 164.8 |
| Lap shear strength (MPa) 10 min @ 155° C. | 3.7 | 9 |
| Lap shear strength (MPa) 60 min @ 190° C. | 5.3 | 8 |
| Penetration | 73 | 44 |

The invention claimed is:

1. A one-component thermosetting epoxy resin composition comprising:

20-55 weight-% of at least one epoxy resin A having on average more than one epoxide group per molecule;

1-6 weight % of at least one latent hardener B for epoxy resins;

0-3 weight-% of at least one accelerator C;

15-50 weight-% of at least one impact modifier D;

0.01-5 weight-% of at least one physical or chemical blowing agent E;

2-35 weight-% of a fibrous anhydrous magnesium oxysulfate MOS;

wherein the thermosetting epoxy resin composition has a needle penetration value (in 0.1 mm) of 20-80 using a total load (weight of the needle and related parts) of 100 g for 5 second with a needle thickness of 1 mm at 23° C.

2. The composition according to claim 1, wherein the latent hardener B is selected from dicyandiamide, guanamines, guanidines, aminoguanidines and derivatives thereof, substituted ureas, imidazoles and amine complexes.

3. The composition according to claim 1, wherein the at least one accelerator C is a substituted urea.

4. The composition according to claim 1, wherein the impact modifier D is selected from the group consisting of blocked polyurethane polymers D1, carboxyl-terminated acrylonitrile/butadiene copolymers D2 and liquid rubbers D4.

5. The composition according to claim 1, wherein the proportion of fibrous anhydrous magnesium oxysulfate MOS is 5-30 weight-%.

6. The composition according to claim 1, wherein the fibrous anhydrous magnesium oxysulfate MOS ($MgSO_4 \cdot 5Mg(OH)_2$) is selected from the group consisting of $MgSO_4 \cdot 5Mg(OH)_2{:}3H_2O$ and $MgSO_4 \cdot 5Mg(OH)_2{:}8H_2O$.

7. The composition according to claim 1, wherein the fibrous anhydrous magnesium oxysulfate MOS has a length of 3 to 1000 μm.

8. The composition according to claim 1, wherein the fibrous anhydrous magnesium oxysulfate MOS has a diameter of 0.1 to 5 μm.

9. The composition according to claim 1, wherein the thermosetting epoxy resin composition is tacky at 23° C., exerting a pressure of 5 kg for 1 second on the surface of the thermosetting epoxy resin composition, the thumb remains sticking to the surface of the thermosetting epoxy resin composition.

10. The composition according to claim 1, wherein thermosetting epoxy resin composition has a needle penetration value (in 0.1 mm) of 20-80, using a total load (weight of the needle and related parts) of 100 g for 5 second with a needle thickness of 1 mm at 23° C.

11. An article having a three-dimensional extent, comprising, the one-component thermosetting epoxy resin composition according to claim 1.

12. The article according to claim 11, wherein as strips, these articles are 20-500 mm, in length, 2-15 mm, in width and 0.5-5 mm, in thickness; and as patches, these articles are 20-500 mm in length and in width and 0.5-5 mm, in thickness.

13. A method for reinforcing heat-stable materials comprising:

obtaining the article having the three-dimensional extent as recited in claim 11, reinforcing the heat-stable materials by applying the article to the materials.

14. A method for reinforcing a structural component comprising the steps:

i) placing the one-component thermosetting epoxy resin composition according to claim 1 or an article having a three-dimensional extent, comprising, the one-component thermosetting epoxy resin composition, in a cavity of a structural component;

ii) heating the one-component thermosetting epoxy resin composition or the article to a temperature from 120° C. to 220° C.

15. An article obtained by the method according to claim 14.

* * * * *